US006186485B1

United States Patent
Kawazoe (10) Patent No.: US 6,186,485 B1
(45) Date of Patent: Feb. 13, 2001

(54) VIBRATION INSULATING APPARATUS AND METHOD

(75) Inventor: Hiroshi Kawazoe, Kanagawa-ken (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/244,775

(22) Filed: Feb. 5, 1999

(30) Foreign Application Priority Data

Feb. 6, 1998 (JP) .................................................. 10-025440

(51) Int. Cl.$^7$ .................................................. F16F 13/00
(52) U.S. Cl. .................. 267/140.14; 267/140.15
(58) Field of Search ........................... 267/140.14, 140.15

(56) References Cited

U.S. PATENT DOCUMENTS

| 5,314,173 |   | 5/1994 | Ide et al. ...................... | 267/140.14 |
| 5,349,537 | * | 9/1994 | Burger et al. ................. | 267/140.15 |
| 5,427,347 | * | 6/1995 | Swanson et al. .............. | 248/550 |
| 5,628,499 | * | 5/1997 | Ikeda et al. .................. | 267/140.14 |
| 5,647,579 | * | 7/1997 | Satoh .......................... | 267/140.14 |
| 5,718,417 | * | 2/1998 | Aoki ........................... | 267/140.14 |
| 5,779,231 |   | 7/1998 | Okazaki et al. ............... | 267/140.14 |
| 5,903,317 | * | 5/1999 | Aoki ........................... | 267/140.14 |
| 5,947,456 | * | 9/1999 | Aoki ........................... | 267/140.14 |
| 6,062,550 | * | 5/2000 | Aoki ........................... | 267/140.13 |

FOREIGN PATENT DOCUMENTS

| 0347666  | 12/1989 | (EP) . |
| 0 809040 | 11/1997 | (EP) . |
| 7-233852 | 9/1995  | (JP) . |
| 8-109946 | 4/1996  | (JP) . |

* cited by examiner

Primary Examiner—Douglas C. Butler
Assistant Examiner—Devon Kramer
(74) Attorney, Agent, or Firm—Foley & Lardner (57) ABSTRACT

A vibration insulating apparatus and a vibration insulating method disclosed herein is preferably applied to a vibration insulating mount disposed between a vibrating body and a mounting body. Here, the vibration insulating mount comprises a fluid chamber filled with fluid, an elastic support partly defining the fluid chamber, a movable member partly defining the fluid chamber, a resilient member resiliently supporting the movable member, and an actuator generating displacing force for the movable member according to a drive signal so as to change volume of the fluid chamber. Also, a reference signal indicative of a vibrating condition of the vibrating body and a residual vibration signal indicative of a residual vibration of the mounting body are generated. Thereupon, a driving signal is generated according to the reference signal and the residual signal and is output to the actuator so as to reduce vibration transmitted from the vibrating body to the mounting body by use of low-pass filter processing, and a cutoff frequency used in the low-pass filter processing is set in accordance with a state of a load applied to the vibration insulating mount.

14 Claims, 8 Drawing Sheets

VIBRATION INSULATING APPARATUS AND METHOD

BACKGROUND OF THE INVENTION

The present invention relates to a vibration insulating apparatus and a vibration insulating method reducing vibration transmitted to a vehicle or the like which is a mounting body from a power unit or the like which is a vibration source by use of an active mounting characteristic, and more particularly, to a vibration insulating apparatus and a vibration insulating method which are conformably used with a vibration isolation mounting device positioned between the vibration source and the mounting body and having a fluid chamber defined by an elastic support so as to change a volume of the fluid chamber by displacing a resiliently supported movable member, so that the change of the volume is applied to a so-called expanding spring of the elastic support.

Japanese Patent Application Laid-open No. H8-109946 discloses an apparatus having an active vibration control function, disposed between a vibration source and a mounting body and capable of reducing the vibration transmitted from the vibration source utilizing its active mounting characteristic.

SUMMARY OF THE INVENTION

According to analysis by the present inventor and the like, the apparatus disclosed in Japanese Patent Application Laid-open No. H8-109946 has a mass/spring system comprising a mass portion which is a movable member constituting a portion of a partition wall of a fluid chamber accommodating fluid, and a spring portion which is a resilient member supporting the movable member, and vibration force is applied to the movable member, thereby exhibiting its active mounting characteristic.

Such a mass/spring system exhibits a resonance phenomenon due to vibration generated in the vibration source and transmitted from the vibration source when the vibration force is applied in such a manner that the active mounting characteristic is to be exhibited, and it is considered that the active mounting characteristic may be influenced.

Therefore, it is preferable to mass of the movable member and a spring constant of the resilient member are set such that the resonance frequency of the mass/spring system becomes higher by one digit than the upper limit frequency in a resonance frequency band of the vibration generated in the vibration source and transmitted therefrom. Further, it is preferable that a driving signal to be applied to an electromagnetic actuator which is a concrete vibration force source is applied through a low-pass filter which brings the resonance frequency of the mass/spring system into a cutoff frequency.

However, according to research by the present inventor, also in such an apparatus having an active vibration control function including a mass/spring system to which the vibration force is applied, even if the above described setting and processing of the driving signal are conducted, the resonance phenomenon is generated when the active mounting characteristic should be exhibited in some cases.

Thereupon, the present inventor repeated further analyses and researches, and have found out that the main reason of the resonance phenomenon is that an applied load which should be mounted by the apparatus acts on the mass/spring system through the fluid in the fluid chamber or the mounting resilient body, and that the resonance frequency of the mass/spring system is largely changed from the initially set value to low frequency side and as a result, the resonance frequency of the mass/spring system is included in the frequency band of the vibration generated in the vibration source and transmitted therefrom.

The present invention has been achieved based on the above described new technical viewpoint, and it is an object of the present invention to provide a vibration insulating apparatus and a vibration insulating method which are conformably used with such a vibration insulating mount and effectively suppress the resonance phenomenon of the mass/spring system due to the vibration transmitted from the vibration source so that its active mounting characteristic can reliably be exhibited.

To achieve the above object, a vibration insulating apparatus according to the present invention is preferably applied to a vibration insulating mount disposed between a vibrating body and a mounting body. Here, the vibration insulating mount comprises a fluid chamber filled with fluid, an elastic support partly defining the fluid chamber, a movable member partly defining the fluid chamber, a resilient member resiliently supporting the movable member, and an actuator generating displacing force for the movable member according to a drive signal so as to change volume of the fluid chamber. Also, the vibration insulating apparatus according to the present invention includes a reference signal generating device detecting a vibrating condition of the vibrating body and outputting a reference signal indicative of the vibrating condition, a residual vibration signal generating device detecting a residual vibration of the mounting body and outputting a residual vibration signal indicative of the residual vibration, and a driving control device calculating the driving signal output to the actuator according to the reference signal and the residual signal so as to reduce vibration transmitted from the vibrating body to the mounting body. Thereupon, the driving control device outputs the driving signal to the actuator by use of low-pass filter processing and a cutoff frequency used in the low-pass filter processing is set in accordance with a state of a load applied to the vibration insulating mount.

In other words, a vibration insulating apparatus of the present invention comprises isolation mounting means disposed between a vibrating body and a mounting body, control means applying a driving signal generated by use of low-pass filter processing to a mass/spring system of the vibration isolation mounting means so as to control the active mounting characteristic of the vibration isolation mounting means, and load detecting means detecting a state of a load applied to the vibration isolation mounting means. Here, a cutoff frequency used in the low-pass filter processing is set in accordance with the state of the load detected by the load detecting means.

On the other hand, a vibration insulating method of the present invention comprises the following steps. That is, The method generates a driving signal by use of low-pass filter processing so as to vibrate a mass/spring system of a vibration isolation mounting device disposed between a vibrating body and a mounting body, applies the driving signal to the mass/spring system of the vibration isolation mounting device to vibrate the mass/spring system, and detects a state of a load applied to the vibration isolation mounting device. Here, a cutoff frequency used in the low-pass filter processing is set in accordance with the detected state of the load.

DETAILED DESCRIPTION OF THE PREFERRED EMBODIMENTS

Each of embodiments of the present invention will be explained in detail with reference to the drawings below.

First, a vibration insulating apparatus and a vibration insulating method according to a first embodiment of the present invention will be explained with reference to FIGS. 1 to 7.

Figure 1:
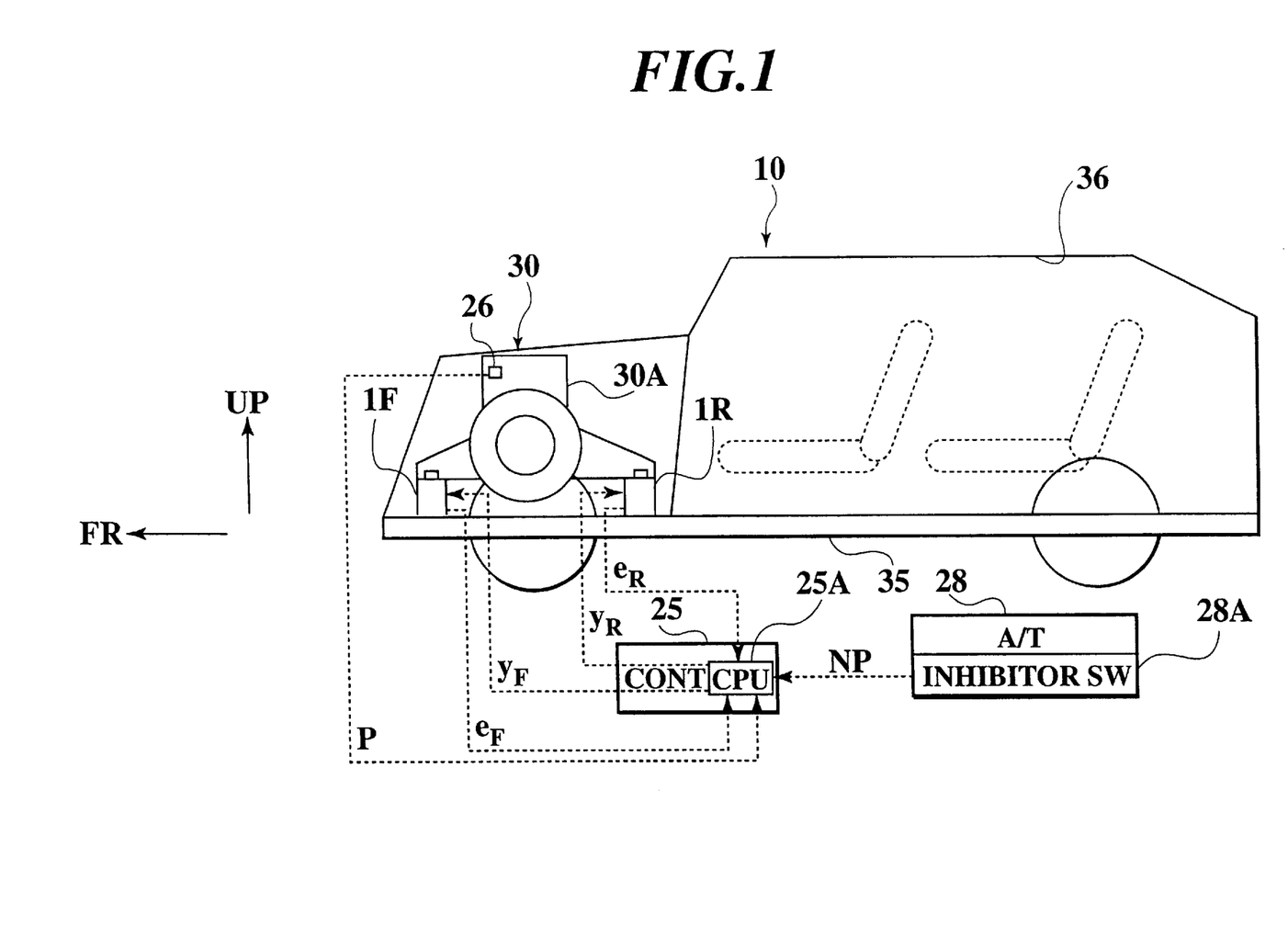
FIG. 1 is a schematic side view of a vehicle to which a vibration insulating apparatus and a vibration insulating method according to a first embodiment of the present invention are applied.
Figure 2:
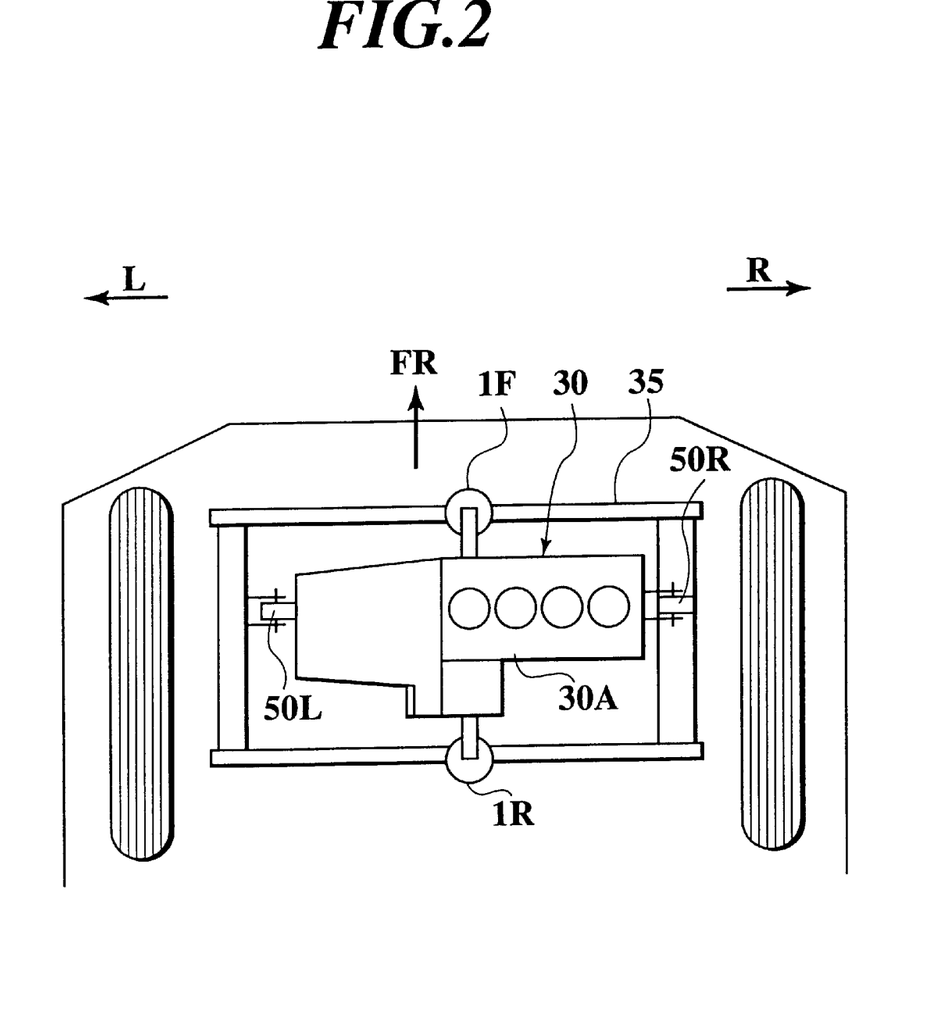
FIG. 2 is a schematic plan view of the vehicle of the first embodiment.

Referring to FIGS. 1 and 2, in a vehicle 10, a power unit 30 including a transversely mounted engine 30A is mounted on a vehicle body 35 including a suspension member and the like at total four positions of a front end, a rear end, a left end and a right end of an engine room of the vehicle 10. That is, an active engine mounts 1F and 1R capable of generating a force so as to reduce vibration transmitted from the engine 30A to the vehicle body 35 (which will be referred to as "active mounting force" hereinafter) in accordance with a driving signal are interposed between the power unit 30 and the vehicle body 35 at two positions of ends of the power unit 30 in the longitudinal direction of the vehicle body 35. On the other hand, engine mounts 50L and 50R for generating passive mounting forces in accordance with relative displacement between the power unit 30 and the vehicle body 35 are interposed between the power unit 30 and the vehicle body 35 at two positions of ends in the lateral direction of the vehicle body 35. As the engine mount 50L or 50R, a normal engine mount for mounting a load by a resilient body such as rubber, or a known fluid charging type mount insulator having a resilient body such as a rubber in which fluid is charged such that a damping force can be generated may be used.

Figure 3:
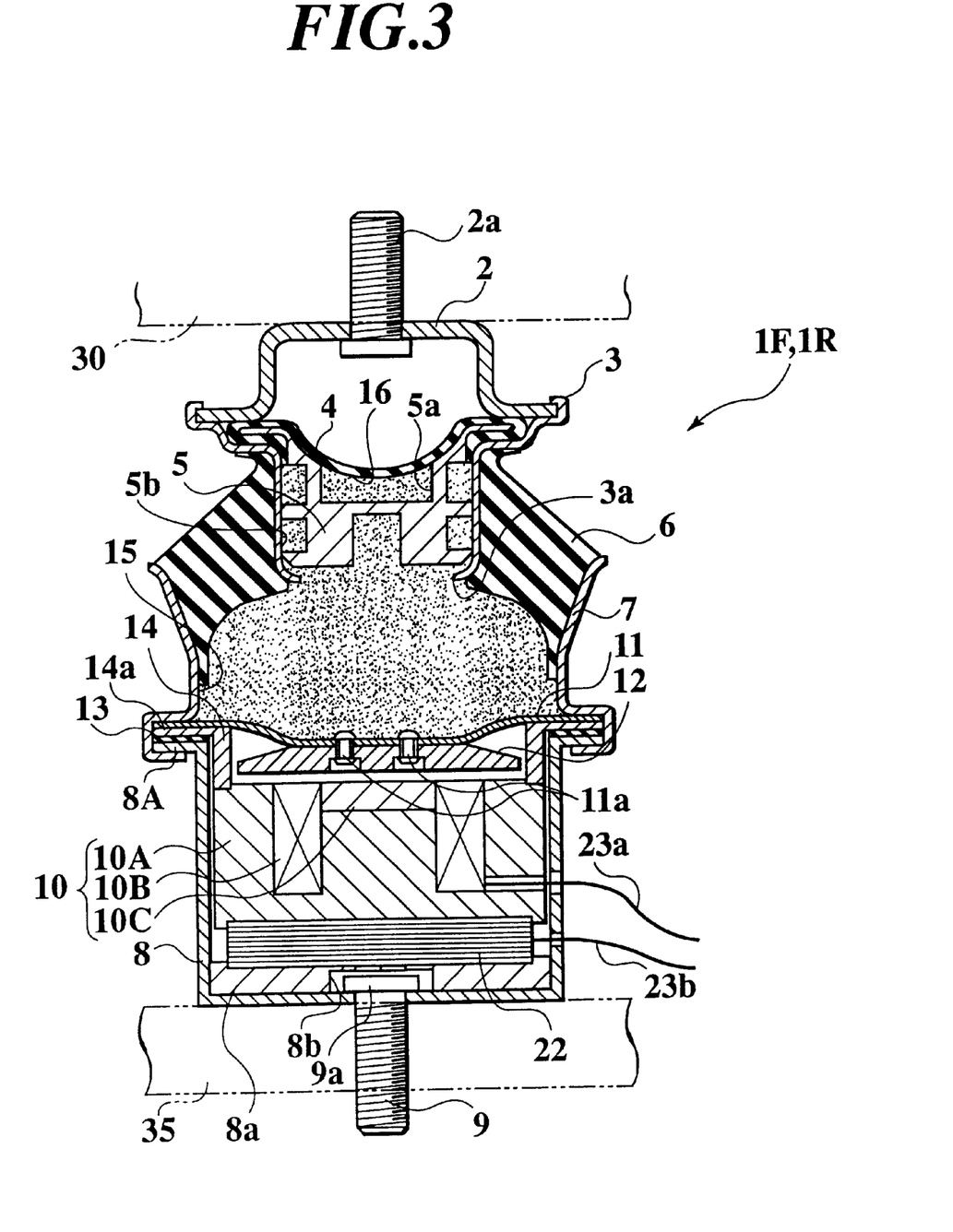
FIG. 3 is a sectional view of an engine mount corresponding to a vibration isolation mounting device to which the vibration insulating apparatus and the vibration insulating method of the first embodiment is applied.

On the other hand, the active engine mounts 1F and 1R are constituted as shown in FIG. 3 specifically. That is, each of the active engine mounts 1F and 1R of the present embodiment has a cap 2 which is integrally provided with a bolt 2a at an upper portion thereof to be attached to the power unit 30 and which has a hollow interior. A lower portion of the cap 2 is opened. An upper end of an inner cylinder 3 having a vertical central axis as same as one of the cap 2 is caulked to an outer surface of a lower portion of the cap 2.

The inner cylinder 3 is shaped such that a diameter of its lower end is reduced, and the lower end is inward bent substantially in the horizontal direction, and a opening 3a is formed in the bent portion. A diaphragm 4 is disposed inside the inner cylinder 3 such that the diaphragm 4 is sandwiched in the caulked portion between the cap 2 and the inner cylinder 3 to vertically divide a space of the cap 2 and the inner cylinder 3 into two. A space above the diaphragm 4 is communicated with atmosphere by opening a hole in a side surface of the cap 2.

Further, an orifice component 5 is disposed inside the inner cylinder 3. The orifice component 5 is formed into a substantially columnar shape in alignment with the inner space of the inner cylinder 3, and is formed at its upper surface with a recess 5a having a circular shape in a plan view. The recess 5a and an opening 3a at a bottom surface communicate with each other through an orifice 5b. The orifice 5b comprises a groove extending spirally along an outer peripheral surface of the orifice component 5, a flow passage (not shown) for bringing one end of the groove and the recess 5a into communication with each other, and another flow passage (not shown) for bringing the other end of the groove and the opening 3a into communication with each other.

On the other hand, to an outer peripheral surface of the inner cylinder 3, an inner peripheral surface of a thick and cylindrical elastic support 6 made of rubber is adhered by curing agent. An inner peripheral surface portion of the elastic support 6 is located above an outer peripheral surface portion thereof, and an intermediate portion thereof is smoothly connected between the inner and outer peripheral surfaces. The outer peripheral surface of the elastic support 6 is adhered by curing agent to an upper portion of an inner peripheral surface of an outer cylinder 7 as a cylindrical member having an upper end is increased in diameter.

A lower end of the outer cylinder 7 is caulked to an upper end of an cylindrical actuator case 8 whose upper surface is opened. A mounting volt 9 to be attached to the vehicle body 35 projects from a lower end surface of the actuator case 8. A head 9a of the mounting bolt 9 is accommodated in a center cavity 8b of a flat plate member 8a disposed in a state in which the flat plate member 8a is attached on an inner bottom surface of the actuator case 8.

Further, an electromagnetic actuator 10 is disposed in the actuator case 8. The electromagnetic actuator 10 comprises a cylindrical iron yoke 10A, an exciting coil 10B coaxially wound such that an central axis of the exciting coil 10B is vertically directed at the center portion of the yoke 10A, and a permanent magnet 10C fixed to an upper portion of the yoke 10A surrounded by the exciting coil 10B such that a pole of the permanent magnet 10C is vertically directed.

An upper end of the actuator case 8 is formed into a flange portion 8A which extends outward so as to form a flange shape. The flange portion 8A is caulked at the lower end of the outer cylinder 7 such that the actuator case 8 and the outer cylinder 7 are integrally formed. Further, a peripheral end portion of a circular metal leaf spring 11 is sandwiched at the caulked portion, and a magnetic passage member 12 capable of being magnetized is fixed, by a rivet 11a, to the center portion of the leaf spring 11 at the side of the electromagnetic actuator 10. The magnetic passage member 12 is a cylindrical member made of iron whose diameter is slightly smaller than that of the yoke 10A, and a bottom surface of the magnetic passage member 12 is formed into a thickness such that the magnetic passage member 12 approaches the electromagnetic actuator 10.

Further, a ring-like thin film resilient member 13 and a flange portion 14a of a force transmitting member 14 are supported by the caulked portion such that they are sandwiched between the flange portion 8A and the leaf spring 11. More specifically, the thin film resilient member 13, the flange portion 14a of the force transmitting member 14 and the leaf spring 11 are superposed on the flange portion 8A of the actuator case 8 in this order, and the entire superposed members are caulked at the lower end of the outer cylinder 7 such that all of them are integrally formed.

The force transmitting member 14 is a substantially short cylindrical member surrounding the magnetic passage member 12, and an upper end of the force transmitting member 14 is formed into the flange portion 14a, and a lower end thereof is connected to an upper surface of the yoke 10A of the electromagnetic actuator 10. More specifically, the lower end of the force transmitting member 14 is fitted to a circle groove formed in an upper end peripheral portion of the yoke 10A such that both of them are connected together. A spring constant when the force transmitting member 14 is resiliently deformed is set to a value greater than a spring constant of the thin film resilient member 13.

In the present embodiment, a fluid chamber 15 is formed in a portion defined between a lower surface of the elastic support 6 and an upper surface of the leaf spring 11, and an auxiliary fluid chamber 16 is formed in a portion defined between the diaphragm 4 and the recess 5a. The fluid chamber 15 and the auxiliary fluid chamber 16 are communicated through the orifice 5b formed in the orifice component 5. Fluid including oil is charged in the fluid chamber 15, the auxiliary fluid chamber 16 and the orifice 5b.

The characteristic such as the fluid mount device determined by a shape of the fluid passage of the orifice 5b and the like is adjusted such that necessary and sufficient high dynamic spring constant and high damping force are exhibited when a so-called engine shake is occurred, i.e., when the active engine mounts 1F and 1R are vibrated at 5 to 15 Hz.

The exciting coil 10B of the electromagnetic actuator 10 generates a predetermined electromagnetic force in accordance with driving signals $y_F$ and $y_R$ which is electric current supplied through a harness 23a from a controller 25 shown in FIG. 1. The controller 25 comprises a CPU 25A, a necessary interface circuit, an A/D converter, a D/A converter, an amplifier and the like. When idling vibration which is vibration having a frequency higher than the engine shake and indistinct sound vibration or vibration at the time of acceleration is input toward the vehicle body 35, the controller 25 generates and output using the CPU 25A the driving signals $y_F$ and $y_R$ to corresponding one of the active engine mounts 1F and 1R so as allow the active engine mounts 1F and 1R to generate the active mounting force capable of reducing the vibration.

In the case of reciprocating four-cylinder four-cycle engine for example, the main cause of the idling vibration or indistinct sound vibration is that engine vibration of a so-called engine revolution secondary component is transmitted to the vehicle body 35. Therefore, if the driving signals $y_F$ and $y_R$ are generated and output synchronously with the engine revolution secondary component, the vibration at the side of the vehicle body 35 can be reduced. In the present embodiment, there is provided a pulse signal generator 26 shown in FIG. 1 for outputting an impulse signal P (in the case of the reciprocating four-cylinder engine for example, one signal is output whenever a crankshaft is rotated through 180 degrees) synchronously with rotation of the crankshaft of the power unit 30. The impulse signal P is supplied to the CPU 25A of the controller 25 as a signal indicative of generation state of vibration in the power unit 30.

On the other hand, a load sensor 22 as vehicle body vibration detecting means for detecting the vibration transmitted from the power unit 30 through the elastic support 6 such as to be sandwiched between a lower end surface of the yoke 10A of the electromagnetic actuator 10 and an upper surface of the flat plate member 8a forming a bottom surface of the actuator case 8. The detected result of the load sensor 22 is supplied to the CPU 25A of the controller 25 through the harness 23b as residue vibration signals $e_F$ and $e_R$. As examples, a piezoelectric element, a magnetostrictor, a strain gauge and the like can be used as the load sensor 22, and the piezoelectric element is used in the present embodiment.

The CPU 25A of the controller 25 calculates the driving signals $y_F$ and $y_R$ for the active engine mounts 1F and 1R by executing a so-called synchronous Filtered-X LMS algorithm based on the residue vibration signal $e_F$ and $e_R$, and the impulse signal P, and output these driving signals $y_F$ and $y_R$ to the active engine mounts 1F and 1R.

More specifically, the CPU 25A of the controller 25 includes adaptive digital filters $W_F$ and $W_R$ having variable filter coefficients $W_{Fi}$ and $W_{Ri}$ (i=0, 1, 2, . . . , I-1: I is the number of taps), and outputs the filter coefficients $W_{Fi}$ and $W_{Ri}$ of the adaptive digital filters $W_F$ and $W_R$ in the order as the driving signals $y_F$ and $y_R$ with a predetermined sampling clock interval from the time when a current impulse signal is input. On the other hand, the CPU 25A of the controller 25 executes processing for appropriately renewing the filter coefficients $W_{Fi}$ and $W_{Ri}$ of the adaptive digital filters $W_F$ and $W_R$ based on the impulse signal P and the residue vibration signal $e_F$ and $e_R$.

More specifically, renewal equations of the adaptive digital filters $W_F$ and $W_R$ based on the Filtered-X LMS algorithm are as follows:

$$W_{Fi}(n+1) = W_{Fi}(n) - \mu R_F^T e_F(n)$$

$$W_{Ri}(n+1) = W_{Ri}(n) - \mu R_R^T e_R(n)$$

Wherein, a term having (n) or (n+1) correspondingly shows that it is a value at a sampling time n or n+1, and $\mu$ is a convergence coefficient. Theoretically, $R_F^T$ and $R_R^T$ are values which are obtained by filter processing regarding the impulse signal P by use of transmit function filters $C_F^\wedge$ and $C_R^\wedge$ which are obtained by modeling transmit functions $C_F$ and $C_R$ between the electromagnetic actuator 10 and the load sensor 22 of the active engine mounts 1F and 1R. Since the magnitude of the impulse signal P is "1", $R_F^T$ and $R_R^T$ correspondingly coincide with the sum of the impulse response waveforms at the sampling time n when the impulse responses of the transmit function filters $C_F^\wedge$ and $C_R^\wedge$ are sequentially generated synchronously with the impulse signal P.

Further, theoretically, signals which are correspondingly obtained by filter processing the impulse signal P by use of the adaptive digital filters $W_F$ and $W_R$ become the driving signals to be applied to the electromagnetic actuator 10, but since the magnitude of the impulse signal P is "1", even if the filter coefficients $W_{Fi}$ and $W_{Ri}$ are used as the driving signals as they are, the same result can be obtained when the result of the filter processing is used as the driving signal.

However, in the present embodiment, the filter coefficients $W_{Fi}$ and $W_{Ri}$ of the adaptive digital filters $W_F$ and $W_R$ are not used as the driving signals as they are, the filter coefficients $W_{Fi}$ and $W_{Ri}$ are subjected to a low-pass filter processing to generate final driving signals $y_{Fi}$ and $y_{Ri}$, and the driving signals $y_{Fi}$ and $y_{Ri}$ which are being subjected to the low-pass filter processing are supplied to the electromagnetic actuator 10 in the order synchronously with the sampling clock.

Further, cutoff frequencies $f_{CF}$ and $f_{CR}$ of the low-pass filter are frequencies each of which is corresponding to a resonance frequency of the mass/spring system which is originally determined by the mass of the magnetic passage member 12 and the spring constant of the leaf spring 11 but is actually deviated toward the low band by an amount of influence due to the loads applied to the active engine mounts 1F and 1R, and the cutoff frequencies $f_{CF}$ and $f_{CR}$ are variable in accordance with the shift position of an automatic transmission 28.

More specifically, when the shift position of the automatic transmission 28 is in N range which is a neutral position or P range which is a parking position, the cutoff frequencies $f_{CF}$ and $f_{CR}$ are set to frequency $f_{NP}$ for both the active engine mounts 1F and 1R. This is because that when the shift position is in the N or P range, it can be considered that a driving reaction force is not applied to the power unit 30 and only the static load of the power unit 30 is applied to the active engine mounts 1F and 1R and therefore, the cutoff frequencies $f_{CF}$ and $f_{CR}$ are set to the medium frequency $f_{NP}$.

When the shift position is a forward position such as D range, the cutoff frequency $f_{CF}$ of the active engine mount 1F at the front side of the vehicle 10 is set to a frequency $f_H$ which is higher than the frequency $f_{NP}$, and the cutoff frequency $f_{CR}$ of the active engine mount 1R at the rear side of the vehicle 10 is set to $f_L$ which is lower than the frequency $f_{NP}$. This is because that when the shift position is in the D range, a driving reaction force is applied to the power unit 30 such that the power unit 30 is inclined rearward of the vehicle 10, a load with respect to the active engine mount 1F is reduced, and a load with respect to the active engine mount 1R is increased. As a result, a resonance frequency of the mass/spring system of the active engine mount 1F whose load is reduced becomes high and thus, the cutoff frequency $f_{CF}$ is set to frequency $f_H$ which is higher than frequency $f_{NP}$, and a resonance frequency of the mass/spring system of the active engine mount 1R whose load is increased becomes low, the cutoff frequency $f_{CR}$ is set to frequency $f_L$ which is lower than frequency $f_{NP}$.

When the shift position is in the R range, the cutoff frequency $f_{CF}$ of the active engine mount 1F at the front side of the vehicle 10 is set to frequency $f_L$, and the cutoff frequency $f_{CR}$ of the active engine mount 1R at the rear side of the vehicle 10 is set to $f_H$. This is because that when the shift position is in the R range which is the reverse position, to the contrary when the shift position is in the D range, a driving reaction force is applied to the power unit 30 such that the power unit 30 is inclined forward of the vehicle 10, a load with respect to the active engine mount 1F is increased, a load with respect to the active engine mount 1R is reduced and as a result, a resonance frequency of the mass/spring system of the active engine mount 1F whose load is increased becomes low and thus, the cutoff frequency $f_{CF}$ is set to frequency $f_L$ which is lower than frequency $f_{NP}$, and a resonance frequency of the mass/spring system of the active engine mount 1R whose load is reduced becomes high and thus, the cutoff frequency $f_{CR}$ is set to frequency $f_H$ which is higher than frequency $f_{NP}$.

Further, in the present embodiment, it is detected which one of the D, R, N and P ranges the gear is shifted to, based on an NP signal which turned ON when an automatic transmission 28 shown in FIG. 1 is in the N or P range, and residue vibration signals $e_F$ and $e_R$ supplied from load sensors 22 incorporated in the active engine mount 1F and 1R.

That is, many of vehicles are generally controlled such that the engine 30A is not started except when the shift position is N or P range. Therefore, in order that the automatic transmission can distinguish a case in which the shift position is in the N or P range from the other case, the NP signal is generated by an inhibitor switch 28A shown in FIG. 1. However, the shift position is detected based on the NP signal only, although the case in which the shift position is in the N or P range can be distinguished from the other case, the D range and the R range can not be distinguished from each other. Therefore, the D range and the R range are distinguished based on the residue vibration signal $e_F$ or $e_R$ immediately after the NP signal is shifted from ON to OFF, i.e., immediately after the gear is shifted to any of the D range and the R range.

Figure 4:
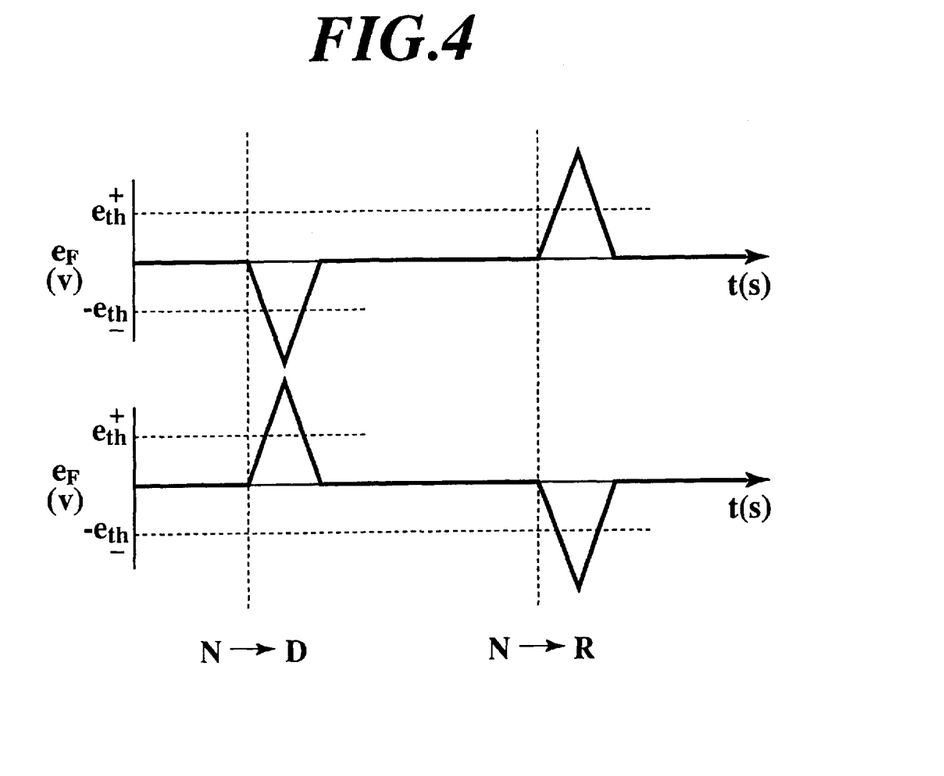
FIG. 4 is a waveform diagram for explaining a residual vibration signal immediately after a shift position of the vehicle of the first embodiment is moved.

More specifically, when the gear is shifted from the N range to the D range, the driving reaction force inclining the power unit 30 rearward of the vehicle 10 is applied to the power unit 30, the load at the side of the active engine mount 1F is reduced, and the load at the side of the active engine mount 1R is increased. Therefore, a change shown in the position of N→D in FIG. 4 is appeared in the residue vibration signals $e_F$ and $e_R$ which are outputs of the load sensor 22, which does not react almost at all on static load which is direct-current component. That is, immediately after the gear is shifted from the N range to the D range, a pulse-like change increasing in a negative direction is appeared in the residue vibration signal $e_F$, and a pulse-like change increasing in a positive direction is appeared in the residual vibration signal $e_R$. Therefore, when at least one of these changes is confirmed immediately after the NP signal is shifted to OFF, it can be judged that the gear is shifted to the D range.

Whereas, when the gear is shifted from the N ranged to the R range, the driving reaction force inclining the power unit 30 forward of the vehicle 10 is applied to the power unit 30, the load at the side of the active engine mount 1F is increased, and the load at the side of the active engine mount 1R is reduced. Therefore, a change shown in the position of N→R in FIG. 4 is appeared in the residue vibration signals $e_F$ and $e_R$. That is, immediately after the gear is shifted from the N range to the R range, a pulse-like change increasing in a positive direction is appeared in the residue vibration signal $e_F$, and a pulse-like change increasing in a negative direction is appeared in the residual vibration signal $e_R$. Therefore, when at least one of these changes is confirmed immediately after the NP signal is shifted to OFF, it can be judged that the gear is shifted to the R range.

Next, the operation of the vibration insulating apparatus of the present embodiment having the above described structure will be explained.

That is, the shape of the flow passage and the like of the orifice 5b is appropriately selected so as to cope with the case that the engine shake is generated. As a result, since the active engine mounts 1F and 1R function as mounting devices with high dynamic spring constant and high damping force, the engine shake generated in the power unit 30 is damped by the active engine mounts 1F and 1R, and the vibration level at the side of the vehicle body 35 is lowered. It is unnecessary to positively displace the movable plate with respect to the engine shake.

On the other hand, vibration of high frequency higher than the idle vibration frequency at which the fluid in the orifice 5b is brought into a so-called stick state and fluid can not move between the fluid chamber 15 and the auxiliary fluid chamber 16 is input to the engine mounts 1F and 1R, a CPU 25A of a controller 25 executes the above described computation processing, outputs the driving signals $y_F$ and $y_R$ to the exciting coil 10B of the electromagnetic actuator 10, and causes the active engine mounts 1F and 1R to generate the active mounting force capable of lowering the vibration at the side of the vehicle body 35.

Here, if the active engine mounts 1F and 1R are considered as being a model of mechanics, it can be assumed that a mounting spring and a so-called expanding spring for the elastic support 6 are interposed in parallel between the power unit 30 and the vehicle body 35, and an electromagnetic force of the electromagnetic actuator 10 is transmitted to the expansion spring through the leaf spring 11 and the fluid in the fluid chamber 15. More specifically, the magnetic passage member 12 is previously displaced to a predetermined offset position by a magnetic force of the permanent magnet 10C, and an electromagnetic force generated by the exciting coil 10B increases or reduces the magnetic force of the permanent magnet 10C. Therefore, the magnetic passage member 12 which is resiliently supported by the leaf spring 11 is displaced in both the positive and negative directions from the offset position in accordance with the frequency and the amplitude of the corresponding driving signals $y_F$ and $y_R$. As a result, volume in the fluid chamber 15 is varied in both the positive and negative directions, and the variation in the volume acts on the expansion spring of the elastic support 6 to generate the active control force between the inner cylinder 3 and the outer cylinder 7.

The driving signals $y_F$ and $y_R$ to be sent to the active engine mounts 1F and 1R are signals which are obtained by the low-pass filter processing by use of the adaptive digital filters $W_F$ and $W_R$, and the adaptive digital filters $W_F$ and $W_R$ are renewed using the above described renewal equations based on the residue vibration signals $e_F$ and $e_R$ which are corresponding to the loads applied to the active engine mounts 1F and 1R as described above. Therefore, if time in some degree is elapsed after the control is started and filter coefficients $W_{Fi}$ and $W_{Ri}$ are converged on or approach the optimal value, the vibration transmitted from the power unit 30 to the side of the vehicle body 35 through the active engine mounts 1F and 1R is canceled by the active mounting force generated by the active engine mounts 1F and 1R, and the vibration level at the side of the vehicle body 35 near the positions of the active engine mounts 1F and 1R is lowered.

Figure 5:
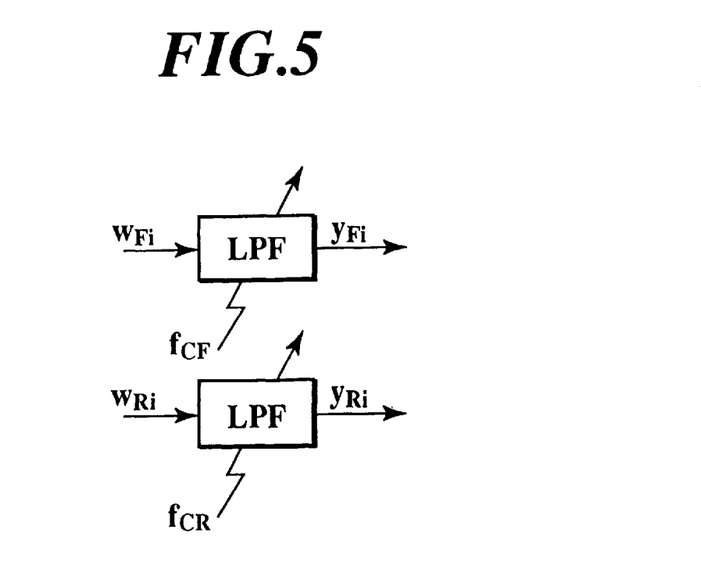
FIG. 5 is a diagram showing the relation regarding an adaptive digital filter and a driving signal in low-pass filter processing of the first embodiment.

Further, as conceptionally shown in FIG. 5, the driving signals $y_{Fi}$ and $y_{Ri}$ are signals generated by use of the low-pass filter processing which process the filter coefficients $W_{Fi}$ and $W_{Ri}$ of the adaptive digital filters $W_F$ and $W_R$ by use of the cutoff frequencies $f_{CF}$ and $f_{CR}$, respectively and therefore, the resonance is prevented from being generated in the mass/spring system including the magnetic passage member 12 which is vibrated by the driving signals $y_{Fi}$ and $y_{Ri}$.

That is, since the cutoff frequencies $f_{CF}$ and $f_{CR}$ of the low-pass filter processing are set lower than the resonance frequency of the mass/spring system determined by the magnetic passage member 12 and the leaf spring 11 by an amount that the loads to be applied to the active engine mounts 1F and 1R are taken into consideration. Therefore, even if the actual resonance frequency of the mass/spring system becomes lower than the resonance frequency when it is considered alone, the resonance is not generated.

Figure 6:
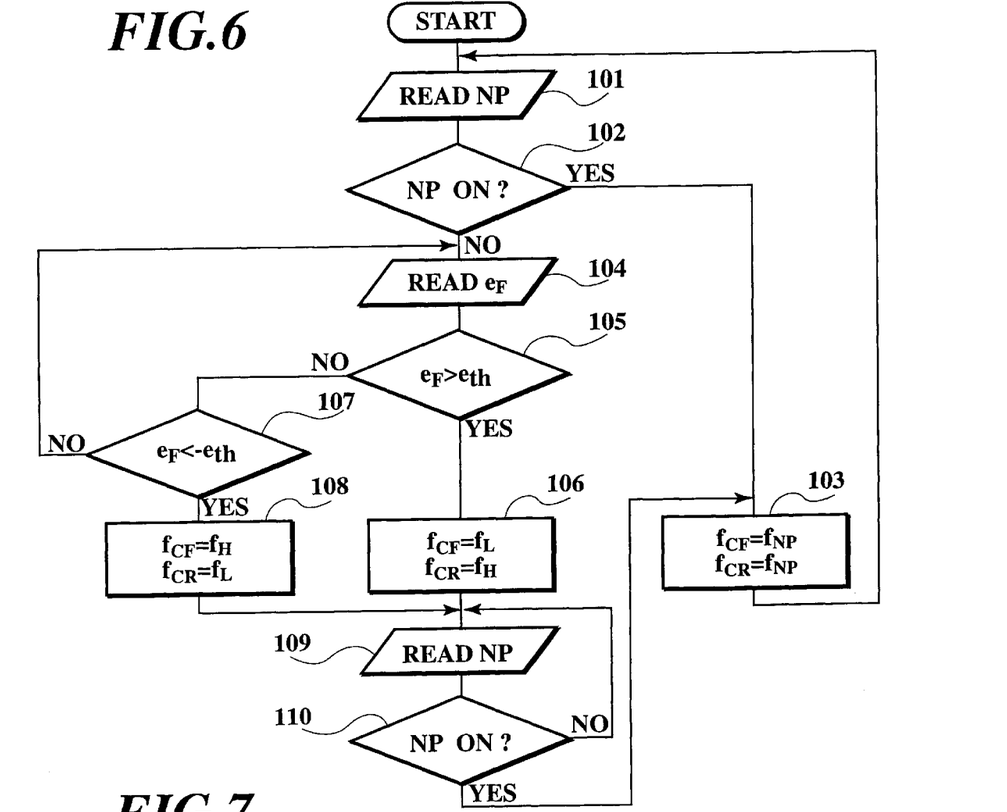
FIG. 6 is a flowchart showing outline of processing conducted in a controller of the vehicle of the first embodiment.
Figure 7:
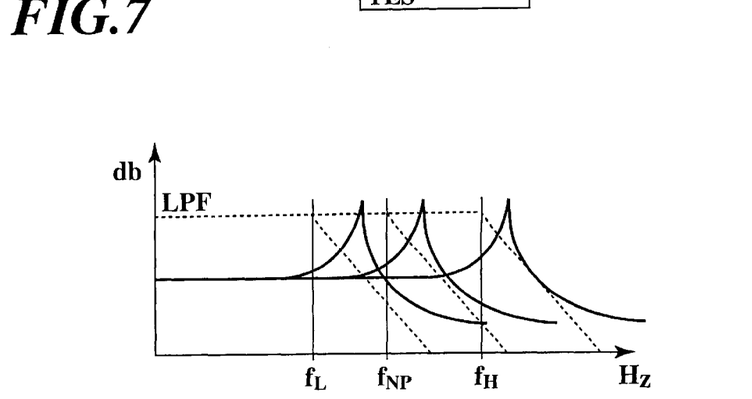
FIG. 7 is a frequency characteristic diagram for explaining change of a cutoff frequency in the low-pass filter processing of the first embodiment.

Also, the low-pass filter processing shown in FIG. 5 is realized as a digital filter in the CPU 25A of the controller 25, and the cutoff frequencies $f_{CF}$ and $f_{CR}$ of the low-pass filter processing are variable in accordance with the shift position as described above. FIG. 6 is a flowchart showing an outline of processing for determining the cutoff frequencies $f_{CF}$ and $f_{CR}$ executed by the CPU 25A of the controller 25, and this processing is executed as interrupting processing per predetermined time together with the renewal processing of the adaptive digital filters $W_F$ and $W_R$ and the low-pass filter processing of the filter coefficients $W_{Fi}$ and $W_{Ri}$, and the like.

That is, when the processing in FIG. 6 is started, the procedure is first advanced to step 101 where the NP signal supplied from the inhibitor switch 28A of the automatic transmission 28 is read. Then, the procedure is advanced to step 102 where it is judged whether or not the NP signal is ON. Here, since the engine 30A can not be started if the shift position is not the N or P range, the NP signal should be always ON immediately after the engine 30A is started and therefore, the result of the judgement of step 102 is "YES" at the first time processing.

If the result of the judgement of step 102 is "YES", the procedure is advanced to step 103 where both the cutoff frequencies $f_{CF}$ and $f_{CR}$ are set to the frequency $f_{NP}$, and the procedure is returned to step 101. Until the result of the judgement in step 102 becomes "NO", processing other than step 103 is not executed. Therefore, a state in which the cutoff frequencies $f_{CF}$ and $f_{CR}$ are set to the frequency $f_{NP}$ is maintained.

Then, if the result of the judgement in step 102 becomes "NO", it can be judged at least that the shift position is changed to the D or R range. Therefore, the procedure is advanced to step 104. In step 104, the current residue vibration signal $e_F$ supplied from the load sensor 22 of the active engine mount 1F at the front side of the vehicle 10 is read.

Next, the procedure is advanced to step 105 where it is judged whether or not the residue vibration signal $e_F$ read in step 104 is greater than a threshold value $e_{th}$ which is a positive value. The threshold value $e_{th}$ is a value of a magnitude capable of detecting a variation in the load applied to the active engine mounts 1F and 1R when the shift position is changed, and according to experiment carried out by the present inventors and the like, since the amplitude of the residue vibration signals $e_F$ and $e_R$ corresponding to the variation of the load is greater than the amplitude of the residue vibration signals $e_F$ and $e_R$ in a normal driving state of the engine 30A, the variation in the load can be detected by appropriately setting the threshold value $e_{th}$.

If the result of the judgement in step 105 is "YES", the positive and great variation in the load in the active engine mount 1F can be confirmed and therefore, it can be judged that the shift position is changed to the R range. Then, the procedure is advanced to step 106, the cutoff frequency $f_{CF}$ of the active engine mount 1F at the side where the load is increased is set to a relatively low frequency $f_L$, and the cutoff frequency $f_{CR}$ of the active engine mount 1R at the side where the load is reduced is set to a relatively high frequency $f_H$.

On the other hand, if the result of the judgement in step 105 is "NO", the procedure is advanced to step 107 where it is judged whether or not the residue vibration signal $e_F$ read in step 104 is smaller than a threshold value $-e_{th}$ which is a value obtained by inverting the polarity of the threshold value $e_{th}$. If "YES" in step 107, since a negative and great variation in the load is confirmed in the active engine mount 1F, the procedure is advanced to step 108, the cutoff frequency $f_{CF}$ of the active engine mount 1F at the side where the load reduced is set to a relatively high frequency $f_H$, and the cutoff frequency $f_{CR}$ of the active engine mount 1R at the side where the load is increased is set to a relatively low frequency $f_L$.

When the result of the judgement in step 107 is "NO", it is judged that the pulse-like signal shown in FIG. 4 has not yet been confirmed, then the procedure is returned to step 104 where the residue vibration signal $e_F$ is read again to execute the processing in step 105 and the subsequent steps. When even if time in some degree is elapsed after the result of the judgement in step 102, the result of any of the judgements in steps 105 and 107 remains "NO", it is judged that the pulse-like signal shown in FIG. 4 could not be confirmed, and the procedure may be advanced to step 109 which will be described later, without executing the processing in steps 106 and 108.

If the cutoff frequencies $f_{CF}$ and $f_{CR}$ are set in step 106 or 108, the procedure is advanced to step 109 where the NP signal generated by the inhibitor switch 28A of the automatic transmission 28 is read. Then, the procedure is advanced to step 110 where it is judged whether or not the NP signal loaded in step 109 is ON. If "NO" in step 109, since it can be judged that the shift position remains in the D or R range and it is unnecessary to set the cutoff frequencies $f_{CF}$ and $f_{CR}$ again, the procedure is returned to step 109.

If "YES" in step 110, since it can be judged that the shift position is changed from the D or R range to the N or P range, the procedure is returned to step 103 where the cutoff frequencies $f_{CF}$ and $f_{CR}$ are set for the N or P range again, and the procedure is returned to step 101.

Owing to the above described processing is carried out, the cutoff frequencies $f_{CF}$ and $f_{CR}$ are deviated toward high or low frequency side such as to follow the variation in the actual resonance frequency of the mass/spring system comprising the magnetic passage member 12 and the leaf spring 11. That is, the transmitting characteristic of the low-pass filter processing shown with the broken line in FIG. 7 becomes a value in which the cutoff frequency are matching to the current resonance frequency of the mass/spring system shown with the solid line. Therefore, the resonance of the mass/spring system can be restrained, and the reduction of the vibration isolation characteristic at the high frequency side can be restrained to the utmost.

Further, in the present embodiment, since the shift position is detected based on the NP signal originally included in a normal vehicle having the automatic transmission 28 and the residue vibration signal $e_F$ supplied to the controller 25 for controlling to reduce the vibration, there is a merit that it is unnecessary to provide a new sensor and the like for detecting the shift position.

Although the residue vibration signal $e_F$ in the front side active engine mount 1F is read to judge the generation of the variation in the load in the present embodiment, it is of course possible to read the residue vibration signal $e_R$ in the rear side active engine mount 1R so as to judge the generation of the variation in the load by use of the residue vibration signal $e_R$, or using both the residue signals $e_F$ and $e_R$. If a sensor for detecting the shift position is provided, such a sensor may be utilized of course.

As in the present embodiment, in the case of that attention is paid to a peak variation in the load of the active engine mounts 1F and 1R due to the variation in the shift position, the cutoff frequency of the low-pass filter processing when the driving signal $y_F$ and $y_R$ to be applied to the active engine mounts 1F and 1R is sufficient if it is treated as an appropriately set fixed value.

However, the resonance frequency of the mass/spring system determined by the magnetic passage member 12 and the leaf spring 11 of the active engine mounts 1F and 1R has characteristic that its moving amount toward low side is continuously increased as load applied to each of the active engine mounts 1F and 1R is continuously increased, and its moving amount toward high side is continuously increased as load applied to each of the active engine mounts 1F and 1R is continuously reduced. Therefore, in a driving state of the vehicle that the continuous variation in the load can be generated in the active engine mounts 1F and 1R, it is better in some cases to handle the cutoff frequency of the low-pass filter processing as a value which continuously varies in order to effectively suppress the resonance phenomenon.

Such a setting of the cutoff frequency of the low-pass filter processing will be explained as a vibration insulating apparatus and a vibration insulating method of a second embodiment of the present invention with reference to FIGS. 8 and 9 below.

In the present embodiment, elements similar to those of the first embodiment are designated by the same reference numerals, and explanation concerning similar structure and processing will be omitted.

In the present embodiment, it is supposed that the shift position is set in the D range, the vehicle 10 is in a running state, acceleration including abrupt acceleration and deceleration including abrupt deceleration can be carried out, the power unit 30 is swung and inclined in the longitudinal direction of the vehicle 10, and loads applied to the active engine mounts 1F and 1R are correspondingly varied.

Figure 8:
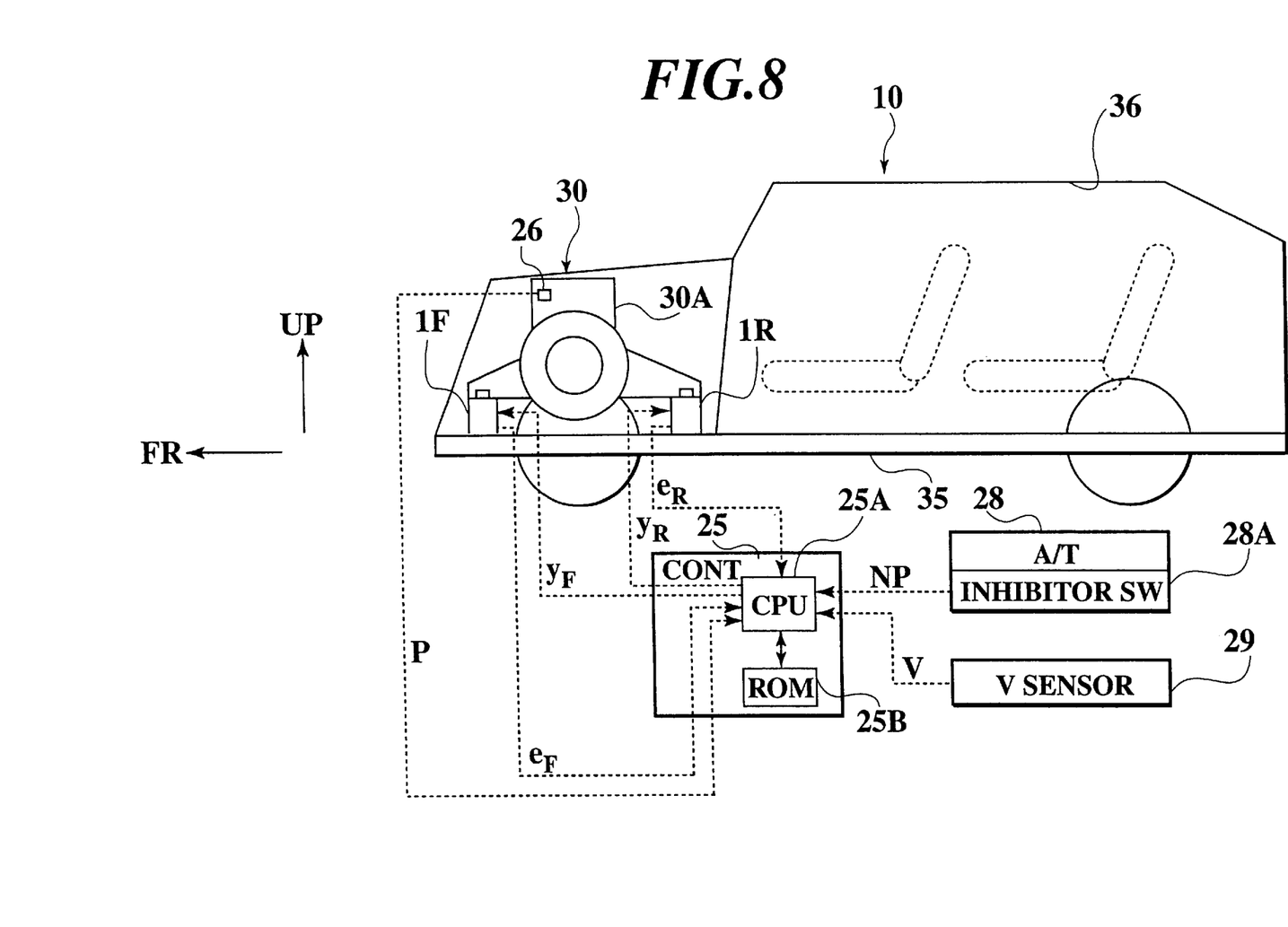
FIG. 8 is a schematic side view of a vehicle to which a vibration insulating apparatus and a vibration insulating method according to a second embodiment of the present invention are applied.

More specifically, as shown in FIG. 8, a vehicle speed sensor 29 for detecting a vehicle speed is provided to the structure of the first embodiment, and a vehicle speed detection signal V corresponding to the vehicle speed detected by the vehicle speed sensor 29 is supplied to the CPU 25A of the controller 25. The CPU 25A of the controller 25 sets the cutoff frequencies $f_{CF}$ and $f_{CR}$ in the low-pass filter processing based on the vehicle speed detection signal V.

Figure 9:
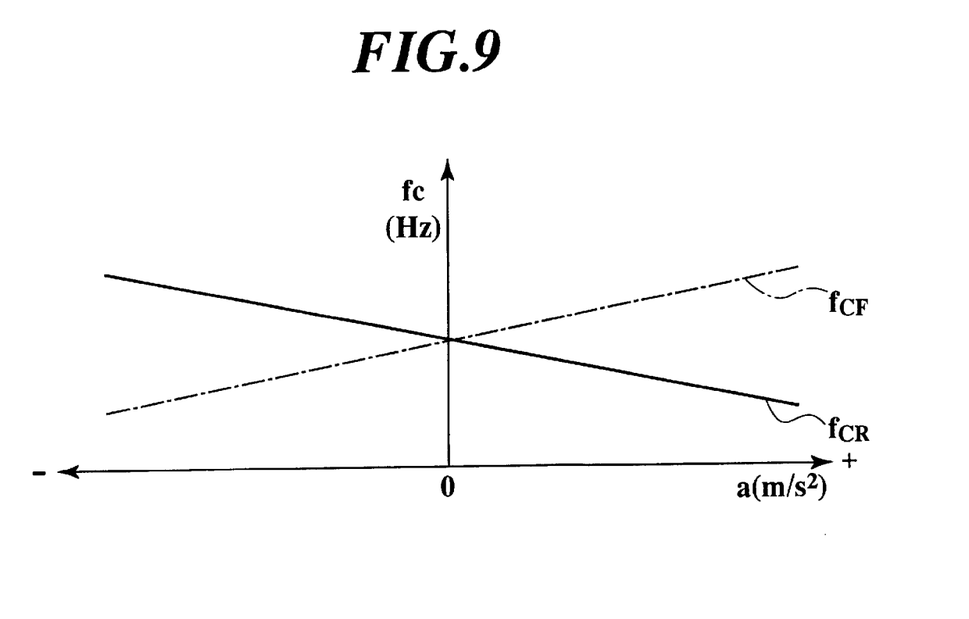
FIG. 9 is a characteristic diagram showing the relation regarding a cutoff frequency used in a low-pass filter and acceleration of the vehicle of the second embodiment.

FIG. 9 is a characteristics chart showing a relation between acceleration "a" of the vehicle 10 and the cutoff frequency $f_{CF}$ of the active engine mount 1F, and a relation between the acceleration "a" of the vehicle 10 and the cutoff frequency $f_{CR}$ of the active engine mount 1R used in the present embodiment. This characteristics chart is previously stored as a look-up table in a ROM 25B provided in the controller 25.

More specifically, as can be understood from FIG. 9, as the acceleration "a" of the forward running vehicle 10 becomes greater, a load acting on the active engine mount 1F is reduced. Therefore, the corresponding cutoff frequency $f_{CF}$ has characteristic that it is in direct proportion to the variation in the acceleration "a". On the other hand, as the acceleration "a" of the forward running vehicle 10 becomes greater, a load acting on the active engine mount 1R is increased. Therefore, the corresponding cutoff frequency $f_{CR}$ has characteristic that it is in inverse proportion to the variation in the acceleration "a". A range of the acceleration is determined in view of performance of the vehicle 10 to which the vibration insulating apparatus is applied.

In the above described structure, the CPU 25A first differentiates the vehicle speed detection signal V sent from the vehicle sensor 29 to obtain the acceleration "a" of the vehicle 10. Then, the CPU 25A refers to the look-up table in the ROM 25B to read the cutoff frequencies $f_{CF}$ and $f_{CR}$ corresponding to the obtained acceleration "a". Then, the cutoff frequencies $f_{CF}$ and $f_{CR}$ read in this manner are actually applied as cutoff frequency used for the low-pass filter processing for generating the driving signals $y_F$ and $y_R$ of the active engine mounts 1F and 1R. After the driving signals $y_F$ and $y_R$ are obtained in this manner, the operation for generating the active mounting force is the same as that of the first embodiment.

Further, if the same processing for obtaining the cutoff frequencies $f_{CF}$ and $f_{CR}$ is repeated whenever an appropriately predetermined time is elapsed, it is possible to keep generating the active mounting force suitable for the latest running state.

In the present embodiment as described above, the cutoff frequencies $f_{CF}$ and $f_{CR}$ of the low-pass filter processing for generating the driving signals $y_F$ and $y_R$ of the active engine mounts 1F and 1R are used such that the cutoff frequencies $f_{CF}$ and $f_{CR}$ continuously correspond to the acceleration a of the vehicle 10. Therefore, even in a running state of the vehicle 10 including abrupt acceleration and abrupt deceleration, the cutoff frequency can sufficiently correspond to such the varying acceleration, and the resonance phenomenon of the mass/spring system of each of the active engine mounts 1F and 1R can effectively be suppressed.

Although the load variation of the active engine mounts 1F and 1R is indirectly detected by obtaining the acceleration from the vehicle speed detected by the vehicle speed sensor 29 in the present embodiment, the acceleration may be directly obtained using the acceleration sensor, or the acceleration may be indirectly obtained from variation in the engine revolution number of variation of the load applied to the engine mount.

It is of course possible to combine the structure of the present embodiment with the structure of the first embodiment. In such a case, the resonance phenomenon of the mass/spring system of each of the active engine mounts 1F and 1R can effectively be suppressed such as to corresponding to variation in the shift position and the acceleration and deceleration during running of the vehicle 10.

Although it is supposed that the shift position is set in the D range and the vehicle 10 is running forward in the present embodiment, it may be supposed that the shift position is set in the R range and the vehicle 10 is running rearward. In such a case, in the characteristic chart in FIG. 9, if the cutoff frequency $f_{CF}$ is applied to the active engine mount 1R, and the cutoff frequency $f_{CR}$ is applied to the active engine mount 1F, the same effect can be obtained basically.

In the present embodiment, the characteristic that the cutoff frequencies $f_{CF}$ and $f_{CR}$ are varied linearly with respect to the acceleration "a" of the vehicle 10 and the cutoff frequencies $f_{CF}$ and $f_{CR}$ become the same value when the acceleration "a" of the vehicle 10 is zero. But the present embodiment is not limited to this characteristic, and the characteristic can be set appropriately in accordance with the structure of the power unit 30 and the mounting characteristic of the active engine mounts 1F and 1R, and the like, of course.

In the present embodiment, processing of threshold value concerning the load used in the first embodiment is not carried out. If it is preferable to adjust the cutoff frequency when the abrupt acceleration or deceleration is generated, such as a processing in steps 104 to 107 as explained in FIG. 6 may be introduced.

Lastly, a vibration insulating apparatus and a vibration insulating method according to a third embodiment of the present invention will be explained with reference to FIGS. 10 and 11.

In the present embodiment also, elements similar to those of the first embodiment are designated by the same reference numerals, and explanation concerning similar structure and processing will be omitted.

In the present embodiment, it is supposed that the shift position is set in the D range, the revolution number R of the engine 30A of the power unit 30 can be increased including abrupt increasing or reduced including abrupt reduce, the power unit 30 is swung and inclined in the longitudinal direction of the vehicle 10 due to the revolution inertia of the engine, and the load with respect to the active engine mounts 1F and 1R is varied. As in the second embodiment, the present embodiment includes a structure for handling the cutoff frequency of the low-pass filter as a value which is continuously varied.

Figure 10:
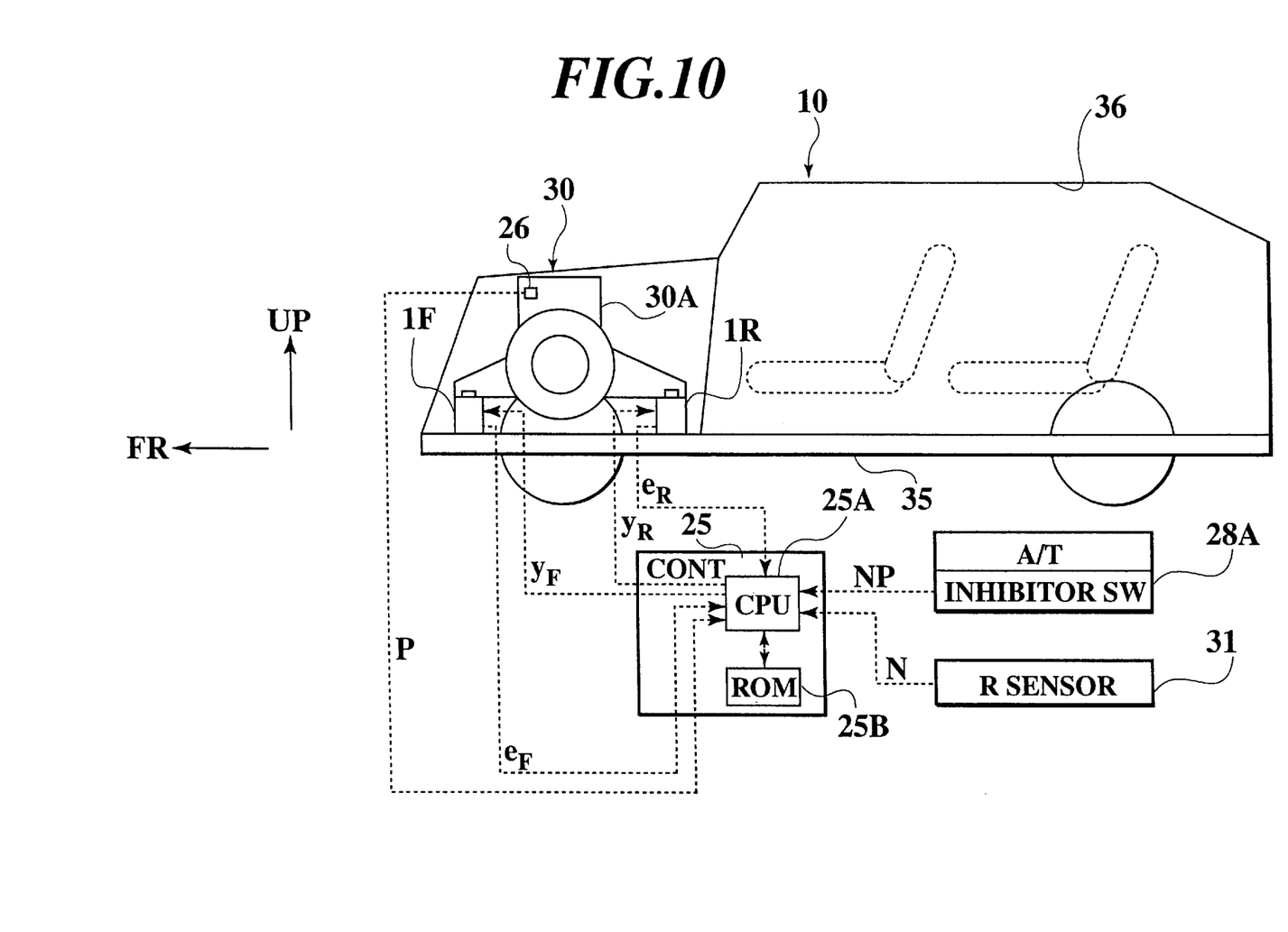
FIG. 10 is a schematic side view of a vehicle to which a vibration insulating apparatus and a vibration insulating method according to a third embodiment of the present invention are applied.

Specifically, a revolution number sensor 31 for detecting the engine revolution number is provided to the structure of the first embodiment as shown in FIG. 10, a detection signal N corresponding to the engine revolution number detected by the revolution number sensor 31 is supplied to the CPU 25A of the controller 25. The CPU 25A of the controller 25 sets the cutoff frequencies $f_{CF}$ and $f_{CR}$ in the low-pass filter based on the detection signal N.

Figure 11:
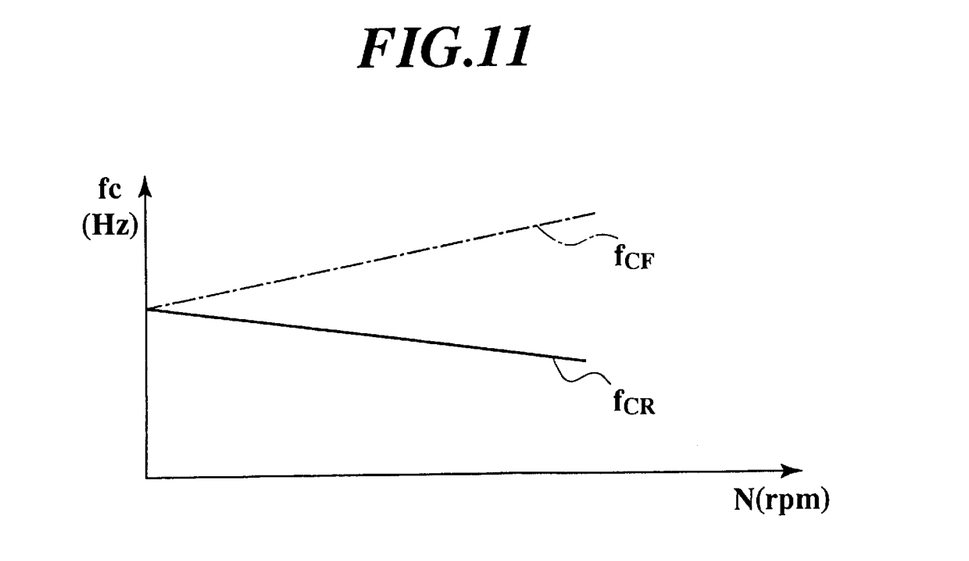
FIG. 11 is a characteristic diagram showing the relation regarding a cutoff frequency used in a low-pass filter and a revolution number of an engine of the vehicle of the third embodiment.

FIG. 11 is a characteristics chart showing a relation between the engine revolution number N and the cutoff frequency $f_{CF}$ of the active engine mount 1F, and a relation between the engine revolution number N and the cutoff frequency $f_{CR}$ of the active engine mount 1R used in the present embodiment. This characteristics chart is previously stored as a look-up table in a ROM 25B provided in the controller 25.

More specifically, as can be understood from FIG. 11, in the power unit 30 of the present embodiment, as the engine revolution number N becomes greater, a load acting on the active engine mount 1F is reduced. Therefore, the corresponding cutoff frequency $f_{CF}$ has characteristic that it is in direct proportion to the variation in the engine revolution number N. On the other hand, as the engine revolution number N becomes greater, a load acting on the active engine mount 1R is increased. Therefore, the corresponding cutoff frequency $f_{CR}$ has characteristic that it is in inverse proportion to the variation in the engine revolution number N.

In the above structure, the CPU 25A refers to the look-up table in the ROM 25B based on the detection signal N concerning the engine revolution number sent from the revolution number sensor 31 to read the corresponding cutoff frequencies $f_{CF}$ and $f_{CR}$ Then, the cutoff frequencies $f_{CF}$ and $f_{CR}$ read in this manner are actually applied as cutoff frequency used for the low-pass filter processing for generating the driving signals $y_F$ and $y_R$ of the active engine mounts 1F and 1R. After the driving signals $y_F$ and $y_R$ are obtained in this manner, the operation for generating the active mounting force is the same as that of the first embodiment.

Further, if the same processing for obtaining the cutoff frequencies $f_{CF}$ and $f_{CR}$ is repeated whenever an appropriately predetermined time is elapsed, it is possible to keep generating the active mounting force suitable for the latest running state.

In the present embodiment as described above, the cutoff frequencies $f_{CF}$ and $f_{CR}$ of the low-pass filter processing for generating the driving signals $y_F$ and $y_R$ of the active engine mounts 1F and 1R are used such that the cutoff frequencies $f_{CF}$ and $f_{CR}$ continuously correspond to the engine revolution number N. Therefore, even in a driving state of the vehicle 10 in which the engine revolution number is abruptly increased or reduced, the cutoff frequency can sufficiently correspond to the varying engine revolution number, and the resonance phenomenon of the mass/spring system of each of the active engine mounts 1F and 1R can effectively be suppressed.

It is of course possible to combine the structure of the present embodiment with the structure of the first embodiment. In such a case, the resonance phenomenon of the mass/spring system of each of the active engine mounts 1F and 1R can effectively be suppressed such as to corresponding to variation in the shift position and the engine revolution number.

It is of course possible to combine the structure of the present embodiment with the structure of the second embodiment. In such a case, the resonance phenomenon of the mass/spring system of each of the active engine mounts 1F and 1R can effectively be suppressed such as to corresponding to the acceleration and deceleration during running of the vehicle 10 and variation in the engine revolution number. However, in such a structure, there is a case in which the acceleration or deceleration may be generated when the engine revolution number is varied and therefore, so the order of priority of the look-up tables to be referred must be previously determined in view of the characteristics of the vehicle or the like.

Although it is supposed in the present embodiment that the shift position is set in the D range and the engine revolution number is varied in a state in which the vehicle 10 is running forward or the brake pedal is pressed downward and the vehicle 10 is stopped, it may be supposed that the shift position is set in the R range and the vehicle 10 is running rearward. Of course, the same can be substantially applied when the revolution direction of the engine 30 is reversed. In such a case, however, in the characteristic chart in FIG. 11, if the cutoff frequency $f_{CF}$ is applied to the active engine mount 1R, and the cutoff frequency $f_{CR}$ is applied to the active engine mount 1F, the same effect can be obtained basically.

In the present embodiment, the characteristic that the cutoff frequencies $f_{CF}$ and $f_{CR}$ are varied linearly with respect to the engine revolution number of the vehicle 10 and the cutoff frequencies $f_{CF}$ and $f_{CR}$ becomes the same value when the engine revolution number of the vehicle 10 is zero. But the present embodiment is not limited to this characteristic, and the characteristic can be set appropriately in accordance with the structure of the power unit 30 and the mounting characteristic of the active engine mounts 1F and 1R, and the like, of course.

In the present embodiment, processing of threshold value concerning the load used in the first embodiment is not carried out. If it is preferable to adjust the cutoff frequency when the abrupt variation of the engine revolution number is generated, such as a processing in steps 104 to 107 as explained in FIG. 6 may be introduced.

In each of the above embodiments, although the description has been made while taking the case of the power unit 30 having a transversely disposed in-line four-cylinder four-cycle reciprocating engine, the engine may be disposed longitudinally, the arrangement of the cylinders may be V-type, and the number of the cylinders may be changed.

For example, when the engine is disposed longitudinally, it is preferable to dispose the pair of active engine mounts are disposed at opposite sides of the power unit, i.e., on the left and right sides of the power unit as viewed from the vehicle 10 such that the load can be preferably received. Of course, the number of the active engine mounts to be used is not limited to two, and in accordance with the needs, a single mount, or three or more mounts may be used.

In each of the above embodiments, the description has been made while taking the case of the vehicle 10 in which the automatic transmission is mounted, since even in a vehicle having a manual transmission or CVT, there is a case in which the load to be applied to the active engine mount is varied, the control of the cutoff frequency can be applied to such a vehicle.

Further, in each of the above embodiments, although the synchronous Filtered-X LMS algorithm is used when the driving signal with respect to the active engine mount is generated, the present invention is not limited to this only, Filtered-X LMS algorithm can also be used, and depending upon a case, a normal feed-back control in accordance with output of the load sensor 22 may be used.

The entire contents of a Patent Application No. TOKUGANHEI 10-25440, with a filling date of Feb. 6, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vibration insulating apparatus comprising:
a vibration insulating mount disposed between a vibrating body and a mounting body, said vibration isolation mounting device insulating mount having a fluid chamber filled with fluid, an elastic support partly defining said fluid chamber, a movable member partly defining said fluid chamber, a resilient member resiliently supporting said movable member, and an actuator generating displacing force for said movable member according to a drive signal so as to change volume of said fluid chamber;
a reference signal generating device detecting a vibrating condition of said vibrating body and outputting a reference signal indicative of said vibrating condition;
a residual vibration signal generating device detecting a residual vibration of said mounting body and outputting a residual vibration signal indicative of said residual vibration; and
a driving control device calculating said driving signal output to said actuator according to said reference signal and said residual signal so as to reduce vibration transmitted from said vibrating body to said mounting body, and said driving control device outputting said driving signal to said actuator by use of low-pass filter processing,
wherein a cutoff frequency used in said low-pass filter processing is set in accordance with a state of a load applied to said vibration insulating mount.

2. A vibration insulating apparatus according to claim 1, wherein said cutoff frequency used in said low-pass filter processing is lowered in accordance with increase in said load applied to said vibration insulating mount, and increased in accordance with reduction in said load applied to said vibration insulating mount.

3. A vibration insulating apparatus according to claim 1, wherein said vibrating body is a power unit including an engine, and said mounting body is a structural member at the side of a vehicle body.

4. A vibration insulating apparatus according to claim 1, wherein said vibration insulating apparatus is applied to a vehicle including a transmission, includes a shift state detector detecting a shift state of said transmission, and set said cutoff frequency in accordance with said shift state detected by said shift state detector.

5. A vibration insulating apparatus according to claim 4, wherein said transmission is an automatic transmission, and said shift state detected by said shift state detector includes a shift position capable of moving said vehicle forward, a shift position capable of moving said vehicle rearward, and a shift position capable of stopping said vehicle.

6. A vibration insulating apparatus according to claim 1, wherein said vibration insulating apparatus is applied to a vehicle, and includes an acceleration state detector detecting an acceleration state of said vehicle, and said driving control device sets said cutoff frequency in accordance with said acceleration state of said vehicle detected by said acceleration state detector.

7. A vibration insulating apparatus according to claim 6, wherein said acceleration state detector detects an acceleration of said vehicle.

8. A vibration insulating apparatus according to claim 1, wherein said vibrating body is a power unit including an engine, said vibration insulating apparatus includes a revolution state detector detecting a revolution state of said engine, and said driving control device sets said cutoff frequency in accordance with said revolution state of said engine detected by said revolution state detector.

9. A vibration insulating apparatus according to claim 8, wherein said revolution state detector detects a revolution number of said engine.

10. A vibration insulating apparatus comprising:
vibration isolation mounting means disposed between a vibrating body and a mounting body;
control means applying a driving signal generated by use of low-pass filter processing to a mass/spring system of said vibration isolation mounting means so as to control said active mounting characteristic of said vibration isolation mounting means; and
load detecting means detecting a state of a load applied to said vibration isolation mounting means,
wherein a cutoff frequency used in said low-pass filter processing is set in accordance with said state of said load detected by said load detecting means.

11. A vibration insulating method comprising:
generating a driving signal by use of low-pass filter processing so as to vibrate a mass/spring system of a vibration isolation mounting device disposed between a vibrating body and a mounting body;
applying said driving signal to said mass/spring system of said vibration isolation mounting device to vibrate said mass/spring system; and
detecting a state of a load applied to said vibration isolation mounting device,
wherein a cutoff frequency used in said low-pass filter processing is set in accordance with said detected state of said load.

12. A vibration insulating method according to claim 11, wherein said vibration isolation mounting device is applied to a vehicle including a transmission, and said detection of said state of said load applied to said vibration isolation mounting device is a detection of a state of a load varying depending upon a shift state of said transmission.

13. A vibration insulating method according to claim 11, said vibration isolation mounting device is applied to a vehicle, and said detection of said state of said load applied to said vibration isolation mounting device is a detection of a state of a load varying depending upon an acceleration state of said vehicle.

14. A vibration insulating method according to claim 11, said vibrating body is a power unit including an engine, and said detection of said state of said load applied to said vibration isolation mounting device is a detection of a state of a load varying depending upon a revolution state of said engine.

* * * * *